United States Patent [19]

Steiner

[11] 4,060,284
[45] Nov. 29, 1977

[54] INSTALLATION FOR THE CONTROL OF THE BRAKE FORCE AT WHEELS OF MOTOR VEHICLES

[75] Inventor: Adolf Steiner, Baden-Baden, Germany

[73] Assignee: Daimler-Benz Aktiengesellschaft, Germany

[21] Appl. No.: 747,724

[22] Filed: Dec. 6, 1976

Related U.S. Application Data

[63] Continuation of Ser. No. 597,177, July 18, 1975, abandoned.

[30] Foreign Application Priority Data

July 22, 1974 Germany .............................. 2435115

[51] Int. Cl.² .............................................. B60T 8/02
[52] U.S. Cl. .................... 303/100; 188/3 R; 188/112 R; 303/93
[58] Field of Search ............ 303/7, 20, 93, 100, 303/105, 112 R, 112 A, 119, 94; 280/432, 446 B; 244/111; 246/182 R; 188/3 R, 112, 181; 180/82 R, 103 BF, 104

[56] References Cited

U.S. PATENT DOCUMENTS

| 3,467,444 | 9/1969 | Leiber | 303/105 |
| 3,545,817 | 12/1970 | Yarber | 303/93 |
| 3,618,983 | 11/1971 | Forse | 303/94 |
| 3,810,521 | 5/1974 | Sparr | 188/112 |
| 3,894,773 | 7/1975 | Cleveland | 188/3 R |
| 3,899,216 | 8/1975 | Putman | 303/100 |

Primary Examiner—Trygve M. Blix
Assistant Examiner—Reinhard J. Eisenzopf
Attorney, Agent, or Firm—Craig & Antonelli

[57] ABSTRACT

An installation for the control of the brake force at the wheels of motor vehicle combinations, such as of truck-trailer combinations, in which one locking protective brake force control system each is coordinated to the truck and to the trailer which operate independently of one another, and by means of which each individual wheel is controllable within the stable range of the friction value-slippage-curve; a measuring device is thereby arranged in the connection between the truck and the trailer for measuring the tow bar force occurring thereat, whereby this measuring device is connected with the locking protective brake force control system of the truck and is operable to produce a signal when a predetermined, pushing tow-bar force value is exceeded, which blocks an increase of the brake force at the truck for the duration of the presence of the signal from the measuring device.

20 Claims, 7 Drawing Figures

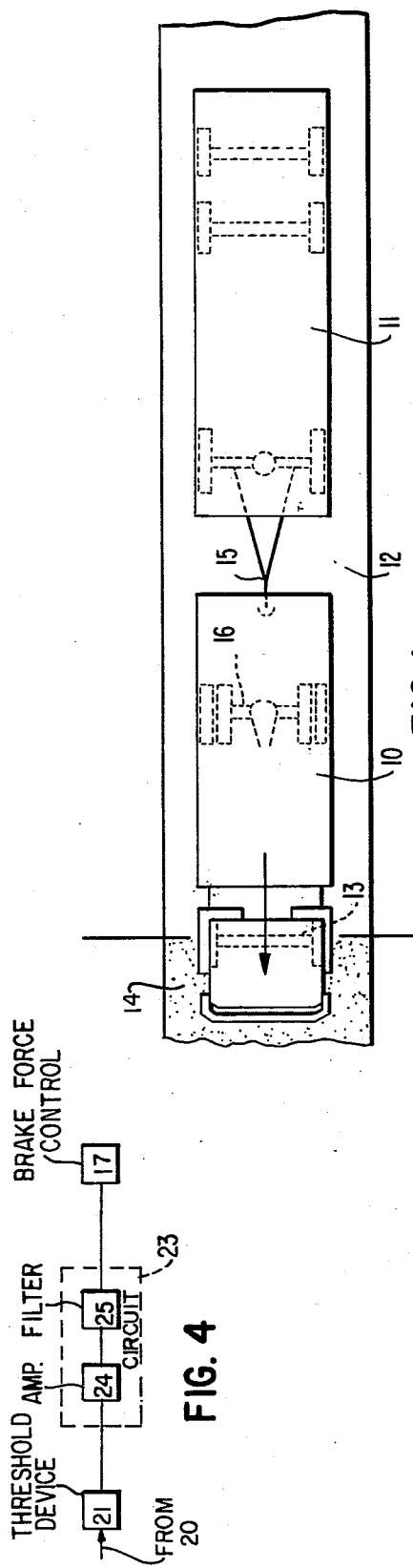
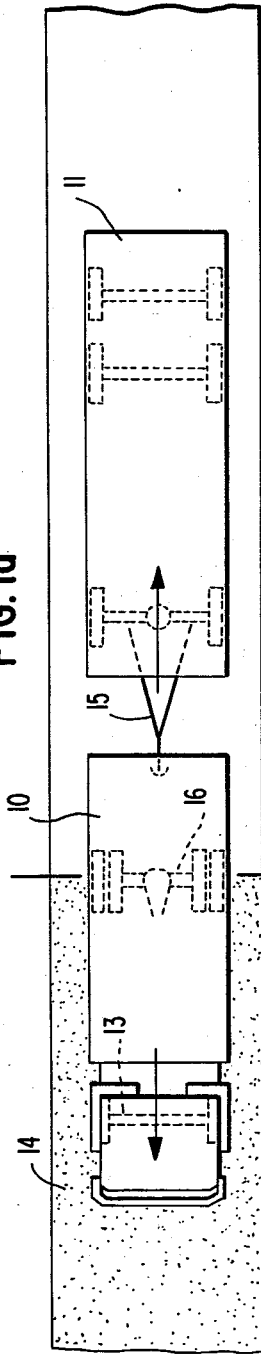
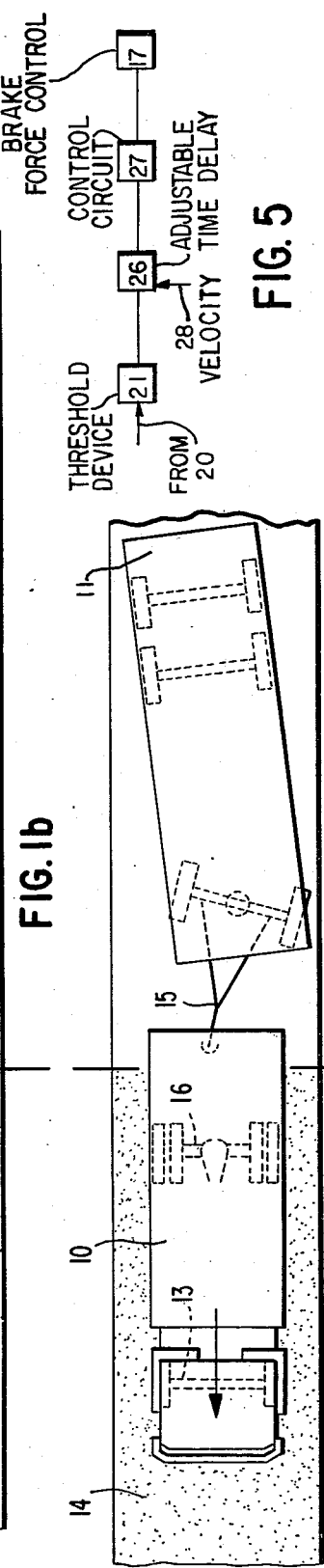

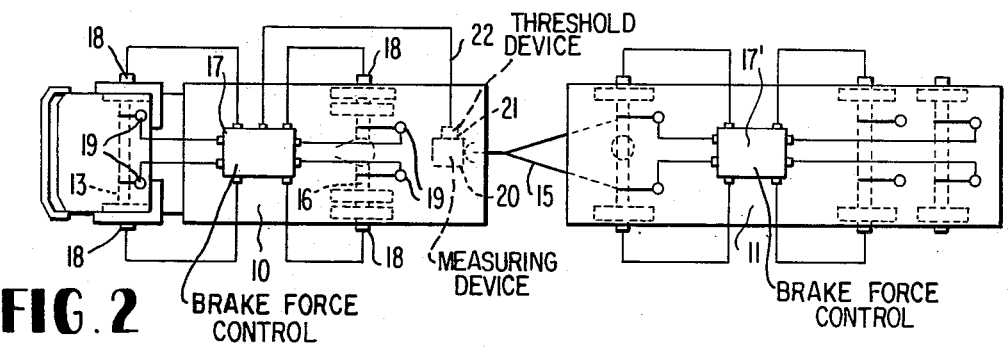
FIG. 2
FIG. 3
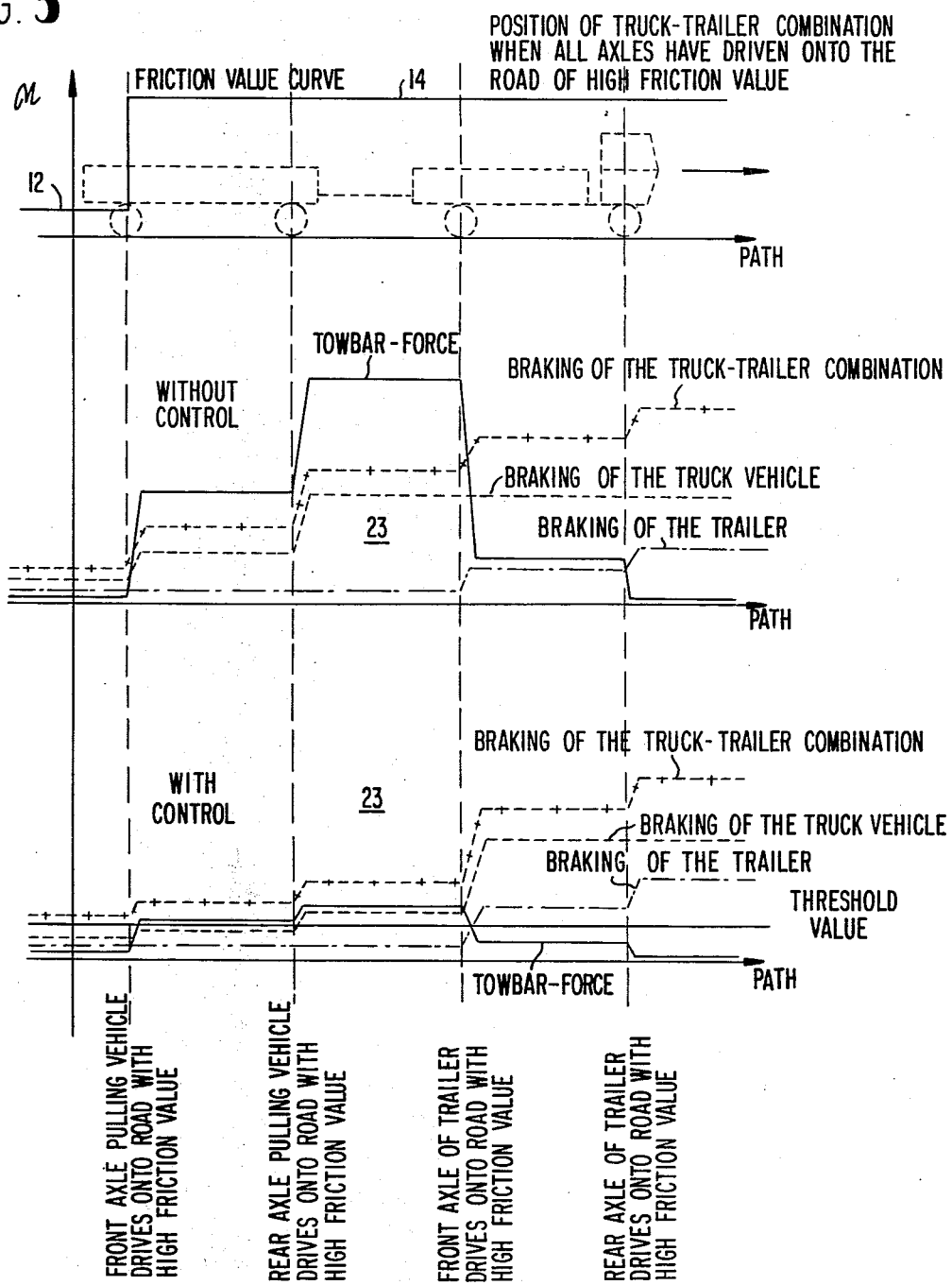

ns, such as truck-trailer combinations, whereby one brake force control installation, which operates by itself, is coordinated to the pulling vehilce (truck) and to the trailer, by means of which each individual wheel is controllable within the stable range of the friction-slippage curve.

INSTALLATION FOR THE CONTROL OF THE BRAKE FORCE AT WHEELS OF MOTOR VEHICLES

This is a continuation of application Ser. No. 597,177, filed July 18, 1975, now abandoned.

The present invention relates to an installation for the control of the brake force at the wheels of interconnected motor vehicle units, such as truck-trailer combinations, whereby one brake force control installation, which operates by itself, is coordinated to the pulling vehilce (truck) and to the trailer, by means of which each individual wheel is controllable within the stable range of the friction-slippage curve.

Brake force control systems or brake slippage control installations are known in the prior art which detect the moving condition of the wheels and which during the beginning of a locking operation, so far reduce the brake force at one or several wheels of a vehicle, that the corresponding wheel or wheels just continue to brake while still rolling on the road, under utilization of the maximum possible friction value between the road surface and the tire. It becomes possible by these systems to brake a vehicle in an optimum manner under all possible road conditions-from dry concrete to an icy surface-while maintaining the vehicle's stability and steerability and more particularly to do so also in curves. When braking in curves, exclusively the prerequisite has to be fulfilled that the non-braked vehicle does not already leave the road due to excessive velocity as a result of the centrifugal force influence.

If one equips in a tractor-trailer unit both vehicles according to the manner described above, then each vehicle brakes for itself in an optimum manner, corresponding to the respectively available friction values, whereby also in this case, priority is given to the lateral guidance behavior and the directional stability. However, precisely, this desired optimum braking of each part of a vehicle combination entails the danger for the truck-trailer combination of swerving or breaking-out, if the friction value or coefficient of the road changes in the course of the braking operation from low values over a very short piece of the road to high values. This might be the case, for example, when the truck-trailer combination passes over from an icy road stretch again onto the dry road stretch.

Since the braking truck-trailer combination drives at first with the truck part onto the road portion having the large friction value, the brake force is increased by the brake force control installation initially at the front axle and then at the rear axle corresponding to the new conditions whereas in contrast thereto, the brake forces at the trailer are still correspondingly small. In such a case, the braking of the pulling truck vehicle is large whereas that of the trailer is small, which has a consequence the feared over-running of the trailer. In such a condition, the trailer may swerve or break-out laterally and may do so even when the brake force at the trailer itself has been reduced by the brake force control installation thereof to the value of zero which may readily be the case, for example, on an icy road stretch. Even if the entire residual friction is then available at these axles for the lateral guidance, the swerving or breaking-out can no longer be prevented as a result of the over-running of the trailer.

The present invention is concerned with the task to avoid this disadvantage. An installation is to be provided according to the present invention, by means of which a breaking-out or swerving of the trailer can be prevented with an operating brake force installation, when the pulling vehicle passes over a road surface having a better friction value or coefficient. The underlying problems are solved in the installations of the aforementioned type in that a measuring member is arranged in the connection between the pulling vehicle section or truck and the trailer for the tow-bar force occurring thereat, in that this measuring member is operatively connected with the brake force control installation of the pulling vehicle, and in that this measuring member produces a signal when a predetermined pushing two-bar force value is exceeded, and that an increase of the brake force at the pulling vehicle is adapted to be blocked for the duration of this signal.

It is already known from the German Offenlegungsschrift No. 2,164,325 to determine the two-bar force between a pulling vehicle and a trailer by means of a measuring member and to utilize the same for the control of the pressure in the brake cylinder of the trailer. A pressure force in the tow-bar thereby effects an increase of the brake pressure at the trailer and—insofar as the wheels thereof are during the braking operation in the stable range of the friction-slippage curve—also an increase of the trailer braking action. As a result thereof, the tow-bar force is kept within limits and simultaneously the braking action of the truck-trailer combination and its trajectoral stability is improved.

If, however, a road portion having a sudden friction value increase is driven over while braking wih a tractor-trailer combination—having this known tow-bar force control system—then a stronger braking action initiated by the driver leads to an immediate locking of the wheels of the trailer—as soon as the pulling vehicle has passed over the road portion with the higher friction value—owing to such a brake force control installation at the trailer (and also without the same) and thus to a swerving or breaking-out of the trailer.

The problem underlying the present invention not only cannot be solved with this known prior art installation but instead it would even favor a swerving or breaking out of the trailer. In the installation according to the present invention, in contradistinction thereto, the increase of the brake force at the pulling vehicle, whether initiated by the driver or regulated by a locking protective installation installed into the vehicle, is prevented in an advantageous manner for such length of time during the transition from a road surface with a poor friction value to a road surface with good friction value, until both vehicle sections are on the road surface with the high friction value. A breaking-out or swerving is therefore prevented with certainty. The present invention is therefore based on the general concept, so to speak of, to preclude an uneven braking of a pulling vehicle and of a trailer in case of road surfaces or road conditions having strongly differing friction values for such length of time until approximately the same friction values or coefficients again apply for the entire truck-trailer combination.

It is additionally proposed by the present invention that a threshold value switch or switching circuit is coordinated to the measuring member which responds when exceeding a predetermined tow-bar force value, and whose digital output signal exists for the duration of the period of time when the predetermined tow-bar force value is exceeded, and is operable to act as blocking signal in the brake force control system of the pulling vehicle. This may take place in a first embodiment in that according to the present invention, the threshold value switch is operatively connected by way of an output-connected circuit consisting of matching amplifier and of a filter or a corresponding circuit with the signal line to the inlet valves of the brake force control installation at the pulling vehicle. In another embodiment according to the present invention, provision is made that a timer circuit having a predetermined running period is started by the digital output signal of the threshold value switch or switching circuit which, in its turn, blocks the inlet valves for this time duration by way of a corresponding circuit of conventional type. It is thereby additionally proposed according to the present invention that the running period of time duration of the timer circuit is automatically variable in dependence on the vehicle velocity in the sense that with an increasing vehicle velocity, the time duration is reduced.

The present invention is applicable analogously also to a semi-trailer or five-wheel trailer. In this case, however, the mass of the taken-along semi-trailer would have to be determined additionally by a measurement of the static semi-trailer or trailer axle pressures. Furthermore, the semi-trailer pushing force would have to be compared by the use of conventional logic elements with the mass of the semi-trailer and with the deceleration of the semi-trailer vehicle and only then would have to be controlled correspondingly. Consequently, not as simple a control is possible in connection therewith as with a truck-trailer combination so that it would be more simple in connection with a semi-trailer motor vehicle to delay the braking increase only at the front axle of the semi-trailer pulling section in the case of a sudden change of the friction value so that the full brake force becomes effective thereat only, when also in that case the endangered rear axle has driven onto the road part with the large friction value.

Accordingly, it is an object of the present invention to provide an installation for controlling the brake force at the wheels of motor vehicle combinations which avoids by simple means the aforementioned shortcomings and drawbacks encountered in the prior art.

Another object of the present invention resides in a brake force control installation for controlling the wheels of motor vehicle truck-trailer combinations which minimizes the danger of swerving by the trailer.

A further object of the present invention resides in a control installation for controlling the brake force at the wheels of motor vehicle truck-trailer combinations which effectively prevents an over-running of the trailer when the truck passes from a road section with a low friction surface onto a road section with a high friction surface.

A still further object of the present invention resides in a brake force control installation of the type described above which is simple in construction, effective in operation and capable of preventing serious accidents due to a lateral swerving of the trailer.

These and further objects, features, and advantages of the present invention will become more apparent from the following description when taken in connection with the accompanying drawing which shows, for purposes of illustration only, one embodiment in accordance with the present invention, and wherein:

FIGS. 1a through 1c are three schematic plan views of a truck-trailer combination in different positions thereof;

FIG. 2 is a schematic diagram of the control installation in accordance with the present invention;

FIG. 5 is a graphical representation of curves representing the tow-bar foce and braking action without and with the control system according to the present invention plotted against the path traversed by the truck-trailer combination;

FIG. 4 is a block diagram representation of a portion of the control system in accordance with an embodiment of the present invention; and FIG. 5 is a block diagram representation of a portion of the control system in accordance with another embodiment of the present invention.

Referring now to the drawings, wherein like reference numerals are used throughout the various views to designate like parts, according to FIG. 1a, a truck-trailer combination, consisting of a pulling vehicle or truck 10 and of the trailer 11 is, for example, on an icy road portion 12 having a low friction coefficient. The front axle 13 of the truck vehicle 10 is exactly in the transition onto a dry road portion 14 with a high friction value or friction coefficient. Up to this point, all of the axles of the truck-trailer combination were therefore on a road portion with essentially the same friction coefficient. The force at the tow-bar 15— as long as no locking protective control takes place—is thereby a function of the individual braking operations of the truck-trailer components and of the weight relation thereof. However, if a brake force control takes place—for example, during a full braking on the icy road portion 12—then the tow-bar force will itself approach a value of zero by the locking protective control system which is of conventional construction known as such in the prior art. However, at the moment at which the front axle 13 of the pulling vehilce 10 passes over onto the dry road portion 14, the locking protective brake force control installation commences to increase the brake force at this front axle 13. This means, the tow-bar force now increases to a higher value. This take place for such length of time until according to FIG. 1b, also the rear axle 16 of the pulling vehicle 10 passes over onto the good road portion 14. Now the brake force is also increased at this rear axle 16 and the tow-bar force further increasees suddenly, so to speak of, which according to FIG. 1c, leads to a breaking-out or swerving of the trailer 11 since the brakes of the trailer 11 not only are not controlled for increased braking action but instead as a result of the road condition, cannot be controlled at all so as to increase the braking action. The trailer 11 will therefore now assume an angular position to the road and an ugly accident is the unavoidable consequence.

According to FIG. 2, the pulling vehicle 10 is equipped with a known locking protective brake force control installation of conventional type. The latter consists of the electronic unit 17 of conventional construction, known as such in the art, which processes the signals of the sensors 18 arranged at the front axle 13 and at the rear axle 16 into switching pulses, by means of which the valves 19 at the two axles or at the respective corresponding wheels are controlled in a known manner. Since the brake force control installation, as such, and th valve control system is known in the art and does not form any part of the present invention, a detailed description thereof is dispensed with herein.

The trailer 11 includes a locking protective brake force control unit 17', constructed in principle in the same manner, which is therefore also not described herein in detail. Both brake force control installations 17 and 17' are completely independent of one another. A measuring member 20 of conventional construction is arranged at the tow-bar 15 which detects the tow-bar force according to magnitude and sign. In the instant case, the two-bar force is primarily of interest if it occurs as pushing or shear force. A threshold switch 21 of conventional construction is coordinated to this measuring member 20 which feeds a digital output signal to the electronic part 17 by way of the line 22 when a predetermined pushing or shear value is exceeded. An upward control, i.e., or increase of the brake force at the pulling vehicle is prevented in a conventional manner by this output signal from the threshold switch 21 for such length of time as this digital output signal occurs, i.e., for such a length of time until also the trailer 11 is on the road portion 14 with the higher friction value. The operative interaction in the brake force control installation of the pulling vehicle 10 thereby takes place by conventional means in such a manner that the signals to the inlet valves of the wheels are correspondingly blocked. Since this can be achieved in a known manner, a detailed description thereof is dispensed with herein for the sake of simplicity. The pulling vehicle or truck 10 therefore continues to brake with a correspondingly small force—even though it is on a road with a good friction value—for such length of time until the predetermined threshold value is again dropped below at the measuring member 20 because in the meantime the trailer 11 has now passed onto the same road portion 14 with the good friction value and its braking action has been raised correspondingly by the locking protective installation.

FIG. 3 is a graphical representation which illustrates at first at the top portion the friction value or friction coefficient curve in the road portions 12 and 14. Plotted directly therebelow are the braking at the trailer and at the pulling vehicle as well as at the entire truck-trailer combination and the resulting tow-bar force. It should be mentioned in that connection that the plotted values do not represent absolute values but are merely intended to bring out the tendency. The curve applies over a predetermined distance or travel and more particularly the four indicated positions of the truck-trailer combination have been picked out. According to the middle portion of FIG. 3, there is shown that within the area 23, a quite considerable tow-bar force occurs. This area 23 corresponds to FIG. 1c, i.e., within this area, the trailer 11 breaks out or swerves.

According to the lower portion of FIG. 3, this high tow-bar force is decreased within the area 23, and mor particularly in that the breaking of the pulling vehicle or truck is delayed in the described manner until at least the front axle of the trailer has also passed over onto the road portion with the high friction value. However, it should be mentioned once again that the indicated lines are not intended to represent absolute values and also no relations to one another but merely a tendency.

Since the various electronic and electromechanical control systems are known as such in the art, a detailed description thereof is dispensed with herein for the sake of simplicity and the same are shown and described only schematically.

As mentioned before, in one embodiment of the present invention as shown in FIG. 4 the threshold switch 21 is operatively connected by way of a circuit 33 including a matching amplifier 24 and a filter 25 or by way of a corresponding circuit with the signal line 22 leading to the inlet valves of the brake force control installation 17 at the truck. However, according to another embodiment of the present invention as shown in FIG. 5, it is also possible that the digital output signal of the threshold switch 21 is used to start a timing circuit 26 providing a predetermined time delay, which timing circuit 27, in turn, blocks by way of a corresponding circuit the inlet valves for this time period. Additionally, the time delay of the timing circuit which may be a conventional timer time delay element or the like, may thereby also be automatically adjustable as a function of the vehicle velocity in accordance with velocity 28 supplied thereto in such a manner that with an increasing vehicle velocity the time period is reduced. Again, since the actual components producing such control are well-known in the art, and involve only conventional circuit elements and circuits, a detailed description thereof is dispensed with herein.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for the control of the brake force at wheels of interconnected motor vehicle combinations including a pulling section and a trailer section connected to the pulling section, which comprises one locking protective brake force control means each coordinated to the pulling section and to the trailer section, said brake force control means being operable to control the individual wheels of a respective section within the stable range of the friction value-slippage-curve, characterized in that a measuring means is arranged in the connection between the pulling section and the trailer section for measuring the tow-bar force occurring thereat, said measuring means being operatively connected only with the locking protective brake force control means of the pulling section and being operable to produce a control signal upon exceeding a predetermined pushing tow-bar force value, and said control signal being operable to block an increase of the brake force in the pulling section for the duration of the control signal, whereby swerving or breaking out of the trailer section when the pulling and trailer sections are on road surfaces having different friction values is prevented.

2. An installation for the control of the brake force at wheels of interconnected motor vehicle combinations including a pulling section and a trailer section connected to the pulling section, which comprises one locking protective brake force control means each coordinated to the pulling section and to the trailer section, said brake force control means being operable to control the individual wheels of a respective section within the stable range of the friction value-slippage-curve, characterized in that a measuring means is arranged in the connection between the pulling section and the trailer section for measuring the tow-bar force occurring thereat, said measuring means being operatively connected with the locking protective brake force control means of the pulling section and being operable to produce a control signal upon exceeding a predetermined pushing tow-bar force value, said control signal being operable to block an increase of the brake force in the pulling section for the duration of the control signal, and characterized in that a threshold switch means is coordinated to the measuring means for producing an output signal upon exceeding a predetermined pushing tow-bar force value, said output signal being operable to at least initiate blocking of an increase of the brake force in the pulling section.

3. An installation according to claim 2, characterized in that said threshold switch means producing a digital output signal for the duration when the predetermined pushing tow-bar force value is exceeded, and said digital output signal being operable as a blocking signal in the brake force control means of the pulling section.

4. An installation according to claim 3, characterized in that the threshold switch means is operatively connected by way of a circuit means including a matching amplifier and a filter means with signal line means leading to inlet valve means of the locking protective brake force control means in the pulling section.

5. An installation according to claim 2, characterized in that a timing means of predetermined duration is started by the output signal of the threshold switch means, which in its turn prevents by way of a further circuit means a pressure increase in brake cylinder means of the brake system of the pulling section for such duration.

6. An installation according to claim 5, characterized in that the timing means includes a time-delay means.

7. An installation according to claim 5, characterized in that the timing means is operable by way of circuit means to close or keep closed the inlet valve means of the brake-slippage brake force control means for its duration.

8. An installation according to claim 7, characterized in that the duration of the timing means is automatically variable in dependence on the vehicle velocity in the sense that with an increasing vehicle velocity the duration is reduced.

9. An installation according to claim 2, characterized in that said threshold switch means producing an output signal for the duration when the predetermined pushing tow-bar force value is exceeded, and said output signal being operable as a blocking signal.

10. An installation according to claim 9, characterized in that the threshold switch means is operatively connected by way of a circuit means including a matching amplifier and a filter means with signal line means leading to inlet valve means of the locking protective brake force control means in the pulling section.

11. An installation according to claim 9, characterized in that a timing means of predetermined duration is started by the output signal of the threshold switch means, which in its turn prevents a pressure increase in the brake system of the pulling section for such duration.

12. An installation according to claim 11, characterized in that the timing means is operable by way of circuit means to close or keep closed the inlet valve means of the brake force control means for its duration.

13. An installation according to claim 11, characterized in that the duration of the timing means is automatically variable in dependence on the vehicle velocity in the sense that with an increasing vehicle velocity the duration is reduced.

14. An installation according to claim 2, characterized in that the threshold switch means is operatively connected by way of a circuit means with signal line means leading to inlet valve means of the locking protective brake force control means in the pulling section.

15. An installation according to claim 14, characterized in that the circuit means includes a matching amplifier and a filter means.

16. An installation according to claim 2, characterized in that a timing means of predetermined duration is started by the outpput signal of the threshold switch means which in its turn prevents a pressure increase in the brake system of the pulling section for such duration.

17. An installation according to claim 16, characterized in that the timing means includes a time-delay means.

18. An installation according to claim 16, characterized in that the timing means is operable by way of circuit means to close or keep closed the inlet valve means of the brake force control means for its duration.

19. An installation according to claim 16, characterized in that the duration of the timing means is automatically variable in dependence on the vehicle velocity in the sense that with an increasing vehicle velocity the duration is reduced.

20. An installation for the control of the brake force at wheels of interconnected motor vehicle combinations including a pulling section and a trailer section connected to the pulling section, which comprises one locking protective brake force control means each coordinated to the pulling section and to the trailer section, said brake force control means being operable to control the individual wheels of a respective section within the stable range of the friction value-slippage-curve, characterized in that a measuring means is arranged in the connection between the pulling section and the trailer section for measuring the tow-bar force occurring thereat, said measuring means being operatively connected with the locking protective brake force control means of the pulling section and being operable to produce a control signal upon exceeding a predetermined pushing tow-bar force value, said control signal being operable to block an increase of the brake force in the pulling section for the duration of the control signal, and wherein the locking protective brake force control means of the pulling section and the locking protective brake force control means of the trailer section are independent of one another.

* * * * *